United States Patent
Spangler et al.

(10) Patent No.: US 9,810,084 B1
(45) Date of Patent: Nov. 7, 2017

(54) GAS TURBINE ENGINE TURBINE VANE BAFFLE AND SERPENTINE COOLING PASSAGE

(71) Applicant: United Technologies Corporation, Hartford, CT (US)

(72) Inventors: Brandon W. Spangler, Vernon, CT (US); Ryan Alan Waite, South Windsor, CT (US); Steven Bruce Gautschi, Naugatuck, CT (US); Benjamin F. Hagan, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 464 days.

(21) Appl. No.: 14/615,509

(22) Filed: Feb. 6, 2015

(51) Int. Cl.
- *F01D 9/06* (2006.01)
- *F01D 25/14* (2006.01)
- *F01D 25/12* (2006.01)

(52) U.S. Cl.
CPC ............ *F01D 9/065* (2013.01); *F01D 25/12* (2013.01); *F01D 25/14* (2013.01); *F05D 2240/126* (2013.01); *F05D 2260/20* (2013.01); *F05D 2260/202* (2013.01); *F05D 2260/204* (2013.01)

(58) Field of Classification Search
CPC ... F01D 5/08; F01D 5/18; F01D 5/181; F01D 5/183; F01D 5/184; F01D 5/186; F01D 5/187; F01D 5/188; F01D 5/189; F01D 9/06; F01D 9/065; F01D 25/12;
(Continued)

(56) References Cited

U.S. PATENT DOCUMENTS

| 4,183,716 A | 1/1980 | Takahara et al. |
| 4,859,141 A * | 8/1989 | Maisch ................. B23P 11/025 415/115 |

(Continued)

OTHER PUBLICATIONS

Extended European Search Report for European Application No. 16154523.1, mailed Jun. 24, 2016.
(Continued)

*Primary Examiner* — Nathaniel Wiehe
*Assistant Examiner* — Adam W Brown
(74) *Attorney, Agent, or Firm* — Carlson, Gaskey & Olds, P.C.

(57) ABSTRACT

An airfoil for a gas turbine engine includes pressure and suction side walls joined to one another at leading and trailing edges. The pressure and suction side walls surround an airfoil cavity and provide an exterior airfoil surface. A baffle is arranged in the airfoil cavity and includes a supply hole. Ribs extend from the pressure and suction side walls into the airfoil cavity and engage the baffle. The ribs are configured to provide a serpentine cooling passage between the baffle and at least one of the pressure and suction side walls. The serpentine cooling passage has first and second passes joined by a bend. The ribs form a film cooling cavity between the first and second passes. The supply hole fluidly connects the baffle to the film cooling cavity. Film cooling holes extend through at least one of the pressure and suction side walls. The film cooling holes are in fluid communication with the film cooling cavity.

20 Claims, 4 Drawing Sheets

(58) Field of Classification Search
CPC .............. F01D 25/14; F05D 2240/126; F05D 2260/20; F05D 2260/202; F05D 2260/204
See application file for complete search history.

(56) References Cited

U.S. PATENT DOCUMENTS

| | | | |
|---|---|---|---|
| 5,120,192 A * | 6/1992 | Ohtomo .................. | F01D 5/189 415/115 |
| 5,207,556 A | 5/1993 | Frederick et al. | |
| 5,259,730 A | 11/1993 | Damlis et al. | |
| 5,328,331 A * | 7/1994 | Bunker .................. | F01D 5/187 415/115 |
| 5,356,265 A * | 10/1994 | Kercher .................. | F01D 5/186 416/97 R |
| 5,640,767 A | 6/1997 | Jackson et al. | |
| 5,820,337 A * | 10/1998 | Jackson .................. | C22C 32/00 415/200 |
| 6,325,593 B1 * | 12/2001 | Darkins, Jr. ............ | F01D 5/186 415/115 |
| 7,625,180 B1 * | 12/2009 | Liang ...................... | F01D 5/186 29/889.2 |
| 7,717,675 B1 | 5/2010 | Liang | |
| 8,152,468 B2 | 4/2012 | Propheter-Hinckley et al. | |
| 8,393,867 B2 | 3/2013 | Chon et al. | |
| 8,480,366 B2 | 7/2013 | Malecki et al. | |
| 8,920,110 B2 * | 12/2014 | Anguisola McFeat . | F01D 5/186 415/115 |
| 2009/0104042 A1 | 4/2009 | Liang | |
| 2013/0052008 A1 | 2/2013 | Spangler | |
| 2014/0093392 A1 * | 4/2014 | Tibbott .................. | F01D 5/189 416/97 R |
| 2015/0267549 A1 * | 9/2015 | Facchinetti ............ | F01D 5/189 415/1 |
| 2016/0097286 A1 * | 4/2016 | Tibbott .................. | F01D 5/188 415/1 |
| 2016/0222796 A1 * | 8/2016 | Spangler ................ | F01D 5/186 |

OTHER PUBLICATIONS

U.S. Appl. 61/872,357, filed Aug. 30, 2013. Title: Baffle for Gas Turbine Engine Vane.

* cited by examiner

GAS TURBINE ENGINE TURBINE VANE BAFFLE AND SERPENTINE COOLING PASSAGE

STATEMENT REGARDING FEDERALLY SPONSORED RESEARCH OR DEVELOPMENT

This invention was made with government support under Contract No. FA8650-09-D-2923-0021 awarded by the United States Air Force. The Government has certain rights in this invention.

BACKGROUND

This disclosure relates to a gas turbine engine, and more particularly to turbine vane cooling arrangements that may be incorporated into a gas turbine engine. More particularly, the disclosure relates to an airfoil and baffle that forms a serpentine cooling passage.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

The vanes typically include a hollow airfoil that is provided a cooling air from a bleed air source to supply cooling fluid to film cooling holes in the airfoil as well as convectively cool the vane. One type of vane has a baffle arranged in a large airfoil cavity. The baffle creates a serpentine passage with the interior surface of the airfoil on both the pressure and suction sides. As the cooling air travels through the serpentine, it convectively cools the part, picking up heat, resulting in the last passage of the serpentine having extremely hot cooling air. The film exiting this last passage is also very hot, resulting in high film temperatures and metal temperatures near the last serpentine passage, which is undesirable.

SUMMARY

In one exemplary embodiment, an airfoil for a gas turbine engine includes pressure and suction side walls joined to one another at leading and trailing edges. The pressure and suction side walls surround an airfoil cavity and provide an exterior airfoil surface. A baffle is arranged in the airfoil cavity and includes a supply hole. Ribs extend from the pressure and suction side walls into the airfoil cavity and engage the baffle. The ribs are configured to provide a serpentine cooling passage between the baffle and at least one of the pressure and suction side walls. The serpentine cooling passage has first and second passes joined by a bend. The ribs form a film cooling cavity between the first and second passes. The supply hole fluidly connects the baffle to the film cooling cavity. Film cooling holes extend through at least one of the pressure and suction side walls. The film cooling holes are in fluid communication with the film cooling cavity.

In a further embodiment of the above, inner and outer platforms are secured to the airfoil.

In a further embodiment of any of the above, the baffle extends radially through the outer platform.

In a further embodiment of any of the above, the ribs include spaced first and second apart ribs that extend radially along and adjacent to the first and second passes. A lateral rib interconnects the first and second ribs and is adjacent to the bend. The first and second ribs and the lateral rib are arranged in a U-shape.

In a further embodiment of any of the above, the supply hole is arranged near the lateral rib.

In a further embodiment of any of the above, the first and second ribs are unbroken along their radial length.

In a further embodiment of any of the above, the ribs form an inlet pass upstream from and parallel to the first and second passes. The inlet pass and first and second passes form an S-shape.

In a further embodiment of any of the above, the baffle and the second rib separate the airfoil cavity to provide the second pass. The exterior airfoil surface has trailing edge cooling apertures at the trailing edge. The second pass is configured to provide cooling fluid to the trailing edge cooling apertures.

In a further embodiment of any of the above, the film cooling holes are oriented toward the trailing edge and at a position upstream from the second pass.

In a further embodiment of any of the above, the serpentine cooling passage is provided between the baffle and both of the pressure and suction sides.

In a further embodiment of any of the above, the baffle is a separate, discrete structure from the pressure and suction side walls.

In another exemplary embodiment, a method of cooling an airfoil for a gas turbine engine includes providing an airfoil that includes pressure and suction side walls joined to one another at leading and trailing edges. The pressure and suction side walls surround an airfoil cavity and provide an exterior airfoil surface. A baffle is arranged in the airfoil cavity and includes a supply hole. Ribs extend from the pressure and suction side walls into the airfoil cavity and engage the baffle. The ribs are configured to provide a serpentine cooling passage between the baffle and at least one of the pressure and suction side walls. The serpentine cooling passage has first and second passes joined by a bend. The ribs form an inlet pass upstream from and parallel to the first and second passes. The inlet pass and first and second passes form an S-shape. The ribs form a film cooling cavity between the first and second passes. The supply hole fluidly connects the baffle to the film cooling cavity. Film cooling holes extend through at least one of the pressure and suction side walls. The film cooling holes are in fluid communication with the film cooling cavity. The first cooling fluid flows along the inlet pass in a first radial direction and is supplied to the inlet pass. The first cooling fluid turns and flows along the first pass in a second radial direction opposite the first radial direction. The first cooling fluid turns at the bend and flows along the second pass in the first direction. A second cooling fluid is supplied through the baffle and through the supply hole and flows through the film cooling cavity and out the film cooling holes.

In a further embodiment of any of the above, inner and outer platforms are secured to the airfoil.

In a further embodiment of any of the above, the baffle extends radially through the outer platform.

In a further embodiment of any of the above, the ribs include spaced first and second apart ribs that extend radially along and adjacent to the first and second passes. A lateral rib interconnects the first and second rib and is adjacent to the bend. The first and second ribs and the lateral rib are arranged in a U-shape and fluidly separate the first and second cooling fluids.

In a further embodiment of any of the above, the supply hole is arranged near the lateral rib.

In a further embodiment of any of the above, the first and second ribs are unbroken along their radial length.

In a further embodiment of any of the above, the baffle and the second rib separate the airfoil cavity to provide the second pass. The exterior airfoil surface has trailing edge cooling apertures at the trailing edge. The method comprises the step of the second pass supplying the first cooling fluid to the trailing edge cooling apertures.

In a further embodiment of any of the above, the film cooling holes are oriented toward the trailing edge and at a position upstream from the second pass.

In a further embodiment of any of the above, the serpentine cooling passage is provided between the baffle and both of the pressure and suction sides.

BRIEF DESCRIPTION OF THE DRAWINGS

The disclosure can be further understood by reference to the following detailed description when considered in connection with the accompanying drawings wherein.

DETAILED DESCRIPTION

Figure 1:
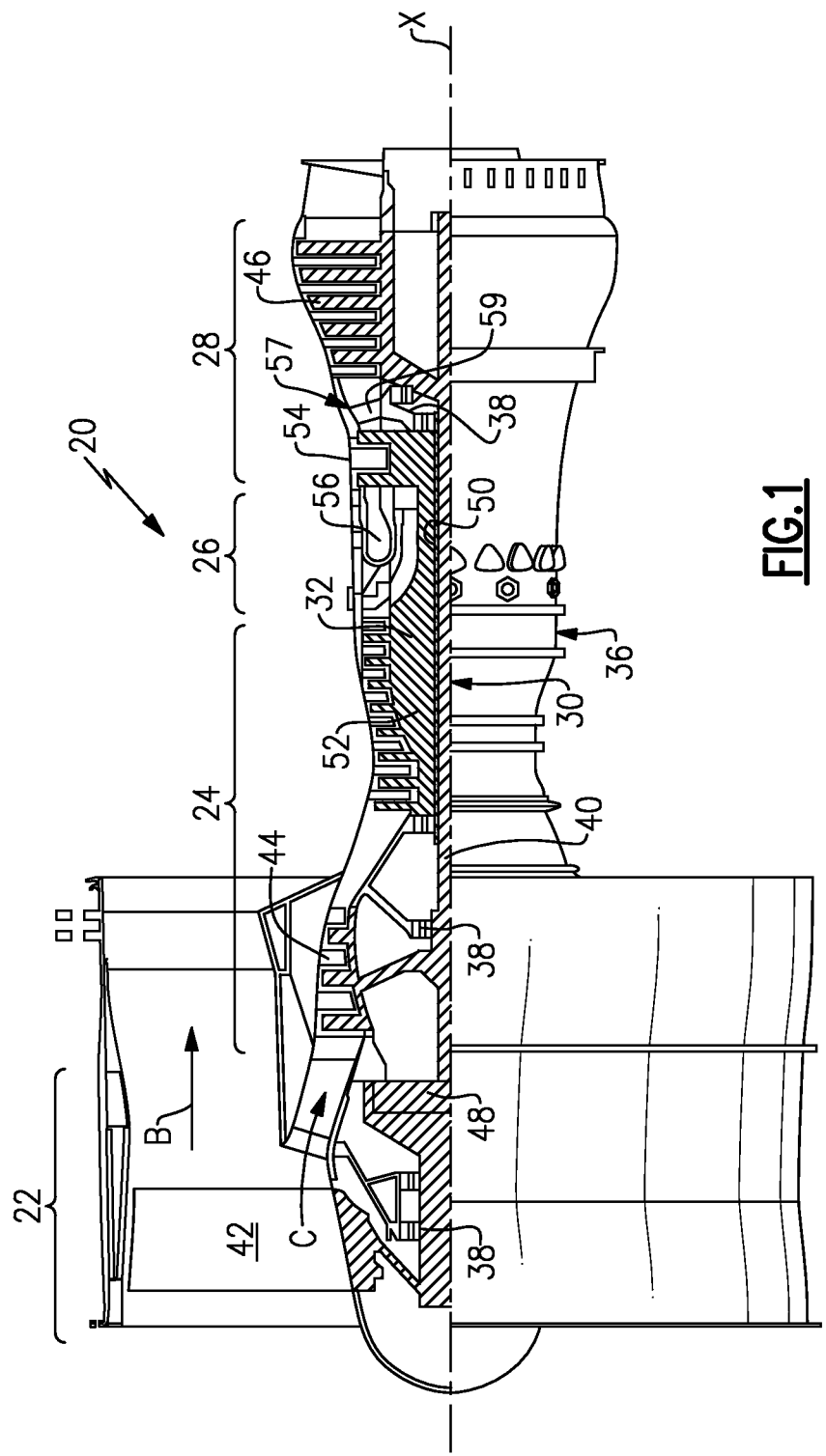
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. Although a commercial gas turbine engine is shown, the disclosed vanes may also be used in military and industrial gas turbine engine applications.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or second) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or first) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6:1), with an example embodiment being greater than about ten (10:1). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
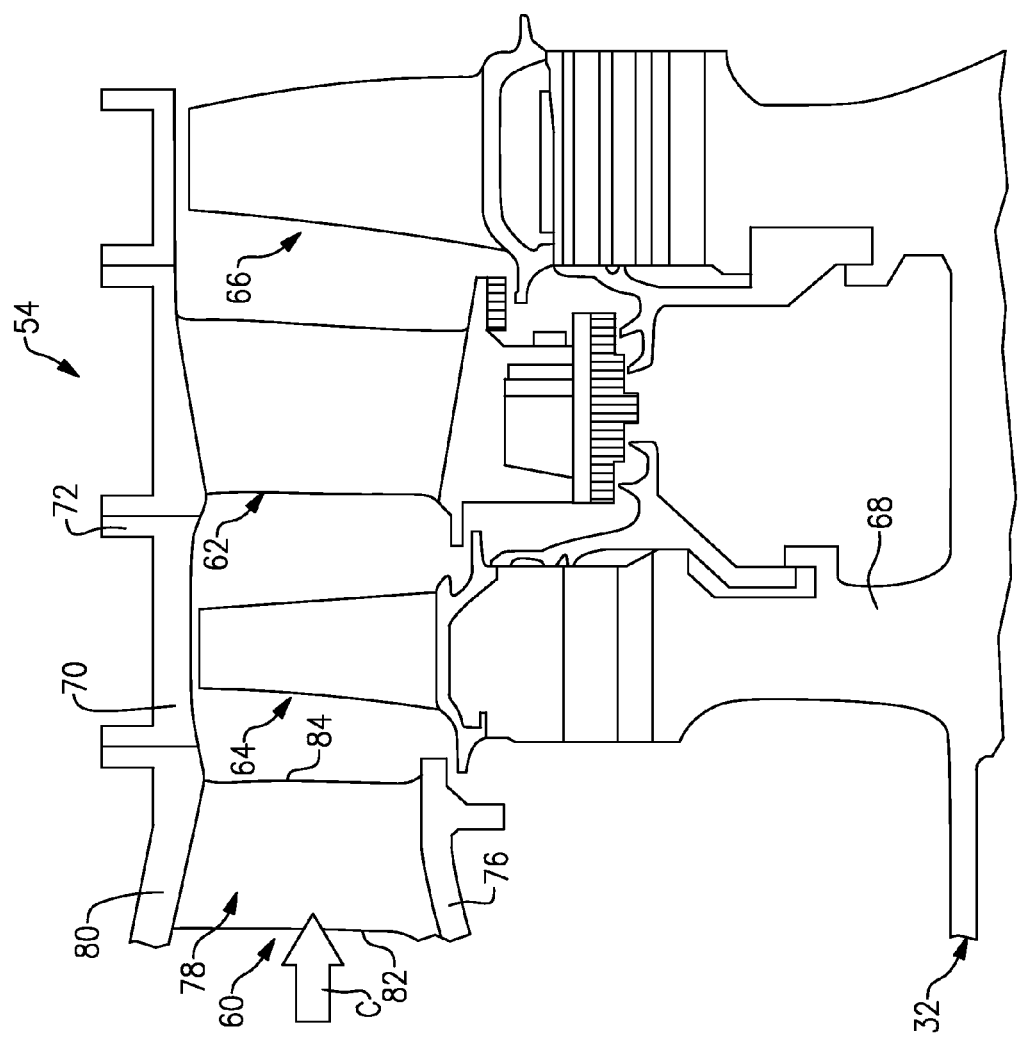
FIG. 2 is a cross-sectional view through a high pressure turbine section.

Referring to FIG. 2, a cross-sectional view through a high pressure turbine section 54 is illustrated. In the example high pressure turbine section 54, first and second arrays of circumferentially spaced fixed vanes 60, 62 are axially spaced apart from one another. A first stage array of circumferentially spaced turbine blades 64, mounted to a rotor disk 68, is arranged axially between the first and second fixed vane arrays. A second stage array of circumferentially spaced turbine blades 66 is arranged aft of the second array of fixed vanes 62.

The turbine blades each include a tip 80 adjacent to a blade outer air seal 70 of a case structure 72. The first and second stage arrays of turbine vanes and first and second stage arrays of turbine blades are arranged within a core flow path C and are operatively connected to a spool 32.

Each vane 60 includes an inner platform 76 and an outer platform 80 respectively defining inner and outer flow paths. The platforms 76, 80 are interconnected by an airfoil 78 extending in a radial direction. It should be understood that the turbine vanes may be discrete from one another or arranged in integrated clusters. The airfoil 78 provides leading and trailing edges 82, 84.

The turbine vanes 60 are constructed from a high strength, heat resistant material such as a nickel-based or cobalt-based superalloy, or of a high temperature, stress resistant ceramic or composite material. In cooled configurations, internal fluid passages and external cooling apertures provide for a combination of impingement and film cooling. Other cooling approaches may be used such as trip strips, pedestals or other convective cooling techniques. In addition, one or more thermal barrier coatings, abrasion-resistant coatings or other protective coatings may be applied to the turbine vane 60.

Referring to FIGS. 3-5B, the airfoil 78 includes pressure and suction side walls 90, 92 joined to one another at the leading and trailing edges 82, 84. The pressure and suction side walls 90, 92 surround an airfoil cavity 96 and provide an exterior airfoil surface 94.

A baffle 98 is arranged in the airfoil cavity 96 and extends radially through the outer platform 80 in the example embodiment. In the example embodiment, the baffle 98 is a separate, discrete structure from the pressure and suction walls 90, 92. However, it should be understood that the baffle may be integrally formed with the airfoil. Ribs 100-108 extend from the pressure and suction side walls 90, 92 into the airfoil cavity 96 and engage the baffle 98 for support. Ribs 100-106 are configured to provide a serpentine cooling passage 112 between the baffle 98 and at least one of the pressure and suction side walls 90, 92 (in the example, on both sides of the airfoil cavity 96).

The serpentine cooling passage 112 includes an inlet pass 114 provided by a third rib 106 and a leading edge rib 108, which interconnects the pressure and suction side walls 90, 92 in an airfoil thickness direction. A first pass 116 is fluidly connected to the inlet pass 114 by a bend 115, and first and second passes 116, 118 are joined by a bend 117. The passes 114-118 are parallel to one another and, with the bends 115, 117, are arranged in an S-shape. The second pass 118 is arranged near the trailing edge 84.

A lateral rib 104, which is adjacent to the bend 117, extends in an airfoil chord-wise direction and interconnects first and second ribs 100, 102 in a U-shape to provide a film cooling cavity 110. The ribs 100-104 are unbroken such that film cooling cavity 110 is surrounded by, but fluidly separated from, the serpentine cooling passage 112.

The baffle 98 includes a supply hole 120 arranged near the lateral rib 104. The supply hole 120 fluidly connects the baffle 98 to the film cooling cavity 110. More than one supply hole may be provided, if desired. Film cooling holes 122 extend through the pressure and suction side walls 90, 92 to the exterior airfoil surface 94. The film cooling holes 122 are in fluid communication with the film cooling cavity 110 and are oriented toward the trailing edge 84 at a position upstream from the second pass 118 to provide a cooling film over the portion of the exterior airfoil surface 94 outside of the second pass 118.

Trailing edge cooling apertures 124 are provided at the trailing edge 84. The second pass 118 is configured to provide cooling fluid to the trailing edge cooling apertures 124. Leading edge cooling holes 132 and other cooling holes 134 are also provided in the pressure and suction side walls 90, 92. It should be understood that fewer and/or additional cooling holes may be provided.

Figure 3:
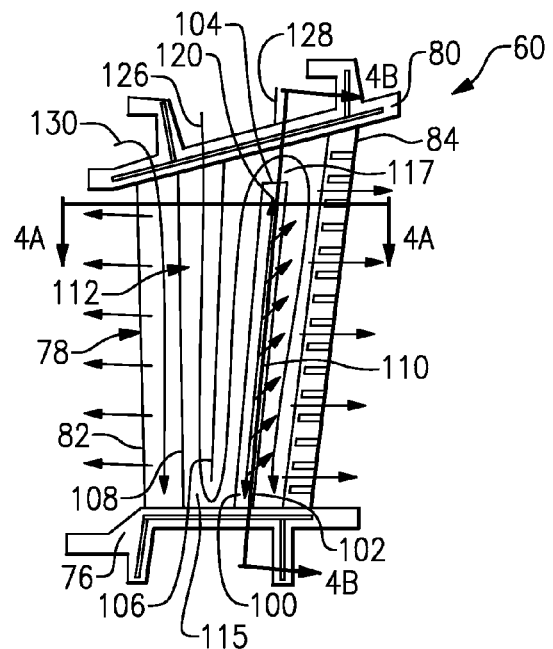
FIG. 3 is a cross-sectional view of a turbine vane for the high pressure turbine section shown in FIG. 2.

In operation, a first cooling fluid 126 is supplied to the inlet pass 114, as best shown in FIG. 3. The first cooling fluid 126 flows along the inlet pass 114 in a first radial direction. The first cooling fluid 126 turns at bend 115 and flows along the first pass 116 in a second radial direction opposite the first radial direction. The first cooling fluid 126 is turned at the second bend 117 and flows along the second pass 118 in the first direction.

Figures 4A, 4B:
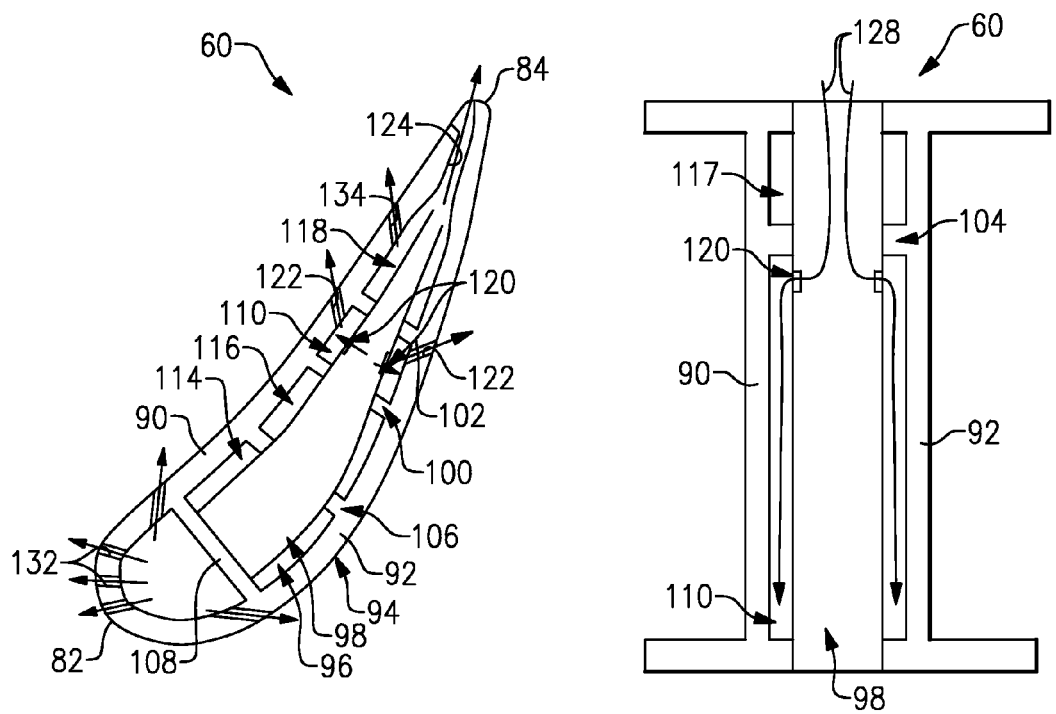
FIG. 4A is a cross-section through the vane shown in FIG. 3 at line 4A-4A.
FIG. 4B is a cross-section through the vane shown in FIG. 3 at line 4B-4B.
Figure 5A:
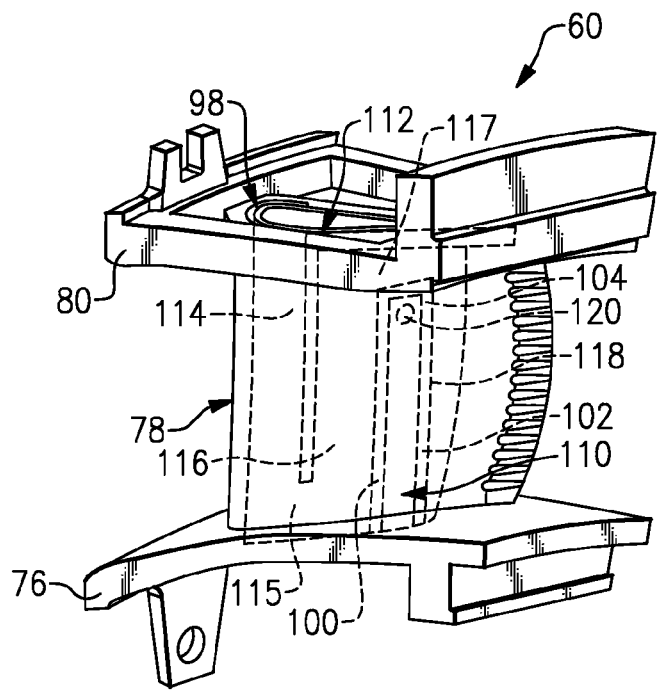
FIG. 5A is a perspective view of the vane shown in FIG. 3 with a serpentine cooling passage shown in phantom.
Figure 5B:
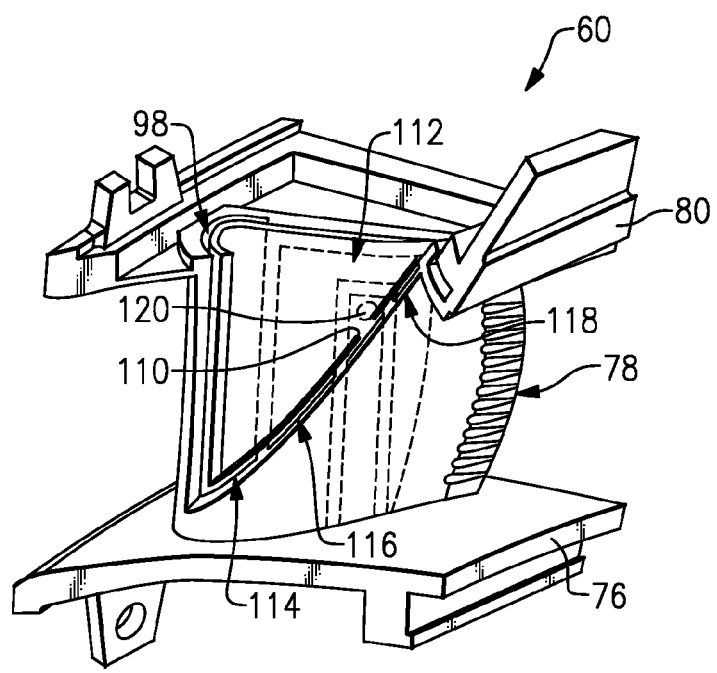
FIG. 5B is a perspective view of the vane shown in FIG. 5A with the airfoil partially broken away.

A second cooling fluid 128, best shown in FIGS. 3 and 4B, is supplied through the baffle 98 and through the supply hole 120. The second cooling fluid 128 flows through the film cooling cavity 110 and out the film cooling holes 122 over the exterior airfoil surface 94 outside the second pass 118.

A third cooling fluid 130 is supplied to a leading edge cooling passage forward of the leading edge rib 108, as shown in FIGS. 3 and 4A. The third cooling fluid 130 exits leading edge cooling holes 132 to provide shower head cooling at the leading edge 82.

Because the serpentine is formed by a baffle, the dedicated film cooling air and serpentine air can be separated by the baffle and ribs. The dedicated film air circumvents the serpentine and is provided to the dedicated film cooling cavity without multiple complicated ceramic cores.

Since the serpentine is formed by the baffle and the serpentine cooling air flows around the outside of the baffle, the dedicated film cooling air can be fed through the middle of the baffle. This approach eliminates any heat pickup before it enters the dedicated film cavity through the film supply hole in the baffle. This results in cold film being applied to the outside of the airfoil while the serpentine is effectively cooling the airfoil from the inside through convection. In addition to cooling the outside of the part with cold film from the dedicated film cavity, the heatup in the last pass of the serpentine is also reduced, due to the lower metal temps from the cold film.

The vane body can be cast while the baffle 98 can be made by forming sheet metal and inserted into cavity 96. In other embodiments, the vane body and/or the baffle 98 could be made from additive manufacturing techniques such as Direct Metal Laser Sintering (DMLS). In still other embodiments, baffle 98 can be cast as an integral part of the vane body.

Although an example embodiment has been disclosed, a worker of ordinary skill in this art would recognize that certain modifications would come within the scope of the claims. For that reason, the following claims should be studied to determine their true scope and content.

What is claimed is:

1. An airfoil for a gas turbine engine comprising:
   pressure and suction side walls joined to one another at leading and trailing edges, the pressure and suction side walls surround an airfoil cavity and provide an exterior airfoil surface;
   a baffle arranged in the airfoil cavity, the baffle includes a supply hole;
   ribs extend from the pressure and suction side walls into the airfoil cavity and engage the baffle, the ribs configured to provide a serpentine cooling passage between the baffle and at least one of the pressure and suction side walls, the serpentine cooling passage has first and second passes joined by a bend, the ribs form a film cooling cavity between the first and second passes, and the supply hole fluidly connects the baffle to the film cooling cavity; and
   film cooling holes extend through the at least one of the pressure and suction side walls, the film cooling holes in fluid communication with the film cooling cavity.

2. The airfoil according to claim 1, comprising inner and outer platforms secured to the airfoil.

3. The airfoil according to claim 2, wherein the baffle extends radially through the outer platform.

4. The airfoil according to claim 1, wherein the ribs include spaced first and second apart ribs that extend radially along and adjacent to the first and second passes, and a lateral rib interconnects the first and second ribs and is adjacent to the bend, the first and second ribs and the lateral rib are arranged in a U-shape.

5. The airfoil according to claim 4, wherein the supply hole is arranged near the lateral rib.

6. The airfoil according to claim 4, wherein the first and second ribs are unbroken along their radial length.

7. The airfoil according to claim 4, wherein the ribs form an inlet pass upstream from and parallel to the first and second passes, the inlet pass and first and second passes form an S-shape.

8. The airfoil according to claim 7, wherein the baffle and the second rib separate the airfoil cavity to provide the second pass, the exterior airfoil surface has trailing edge cooling apertures at the trailing edge, the second pass configured to provide cooling fluid to the trailing edge cooling apertures.

9. The airfoil according to claim 7, wherein the film cooling holes are oriented toward the trailing edge and at a position upstream from the second pass.

10. The airfoil according to claim 1, wherein the serpentine cooling passage is provided between the baffle and both of the pressure and suction sides.

11. The airfoil according to claim 1, wherein the baffle is a separate, discrete structure from the pressure and suction side walls.

12. A method of cooling an airfoil for a gas turbine engine, the method comprising:
    providing an airfoil that includes:
       pressure and suction side walls joined to one another at leading and trailing edges, the pressure and suction side walls surround an airfoil cavity and provide an exterior airfoil surface;
       a baffle arranged in the airfoil cavity, the baffle includes a supply hole;
       ribs extend from the pressure and suction side walls into the airfoil cavity and engage the baffle, the ribs are configured to provide a serpentine cooling passage between the baffle and at least one of the pressure and suction side walls, the serpentine cooling passage has first and second passes joined by a bend, the ribs form an inlet pass upstream from and parallel to the first and second passes, the inlet pass and first and second passes form an S-shape, the ribs form a film cooling cavity between the first and second passes, and the supply hole fluidly connects the baffle to the film cooling cavity; and
       film cooling holes extend through the at least one of the pressure and suction side walls, the film cooling holes in fluid communication with the film cooling cavity; and
    supplying a first cooling fluid to the inlet pass, the first cooling fluid flows along the inlet pass in a first radial direction;
    turning the first cooling fluid and flowing the first cooling fluid along the first pass in a second radial direction opposite the first radial direction;
    turning the first cooling fluid at the bend and flowing the first cooling fluid along the second pass in the first direction; and
    supplying a second cooling fluid through the baffle and through the supply hole, flowing the second cooling fluid through the film cooling cavity and out the film cooling holes.

13. The method according to claim 12, comprising inner and outer platforms secured to the airfoil.

14. The method according to claim 13, wherein the baffle extends radially through the outer platform.

15. The method according to claim 12, wherein the ribs include spaced first and second apart ribs that extend radially along and adjacent to the first and second passes, and a lateral rib interconnects the first and second rib and is adjacent to the bend, the first and second ribs and the lateral rib arranged in a U-shape and fluidly separating the first and second cooling fluids.

16. The method according to claim 15, wherein the supply hole is arranged near the lateral rib.

17. The method according to claim 15, wherein the first and second ribs are unbroken along their radial length.

18. The method according to claim 15, wherein the baffle and the second rib separate the airfoil cavity to provide the second pass, the exterior airfoil surface has trailing edge cooling apertures at the trailing edge, comprising the step of the second pass supplying the first cooling fluid to the trailing edge cooling apertures.

19. The method according to claim 15, wherein the film cooling holes are oriented toward the trailing edge and at a position upstream from the second pass.

20. The method according to claim 12, wherein the serpentine cooling passage is provided between the baffle and both of the pressure and suction sides.

* * * * *